United States Patent [19]
Marioni

[11] Patent Number: 5,568,587
[45] Date of Patent: Oct. 22, 1996

[54] ELECTRONIC IMMERSION AQUARIUM HEATER WITH SPRING BIASED NTC SENSOR

[75] Inventor: Elio Marioni, Povolaro Dueville, Italy

[73] Assignee: Askoll S.p.A., Povolaro Dueville, Italy

[21] Appl. No.: 499,842

[22] Filed: Jul. 10, 1995

[30] Foreign Application Priority Data

Jul. 15, 1994 [IT] Italy .................................. PD94A0133

[51] Int. Cl.⁶ .............................. H05B 3/80; A01K 63/06
[52] U.S. Cl. ........................ 392/498; 392/501; 392/502; 219/523
[58] Field of Search ..................................... 392/498, 502, 392/501, 497; 219/523, 505; 374/208

[56] References Cited

U.S. PATENT DOCUMENTS

| | | | |
|---|---|---|---|
| 2,953,921 | 9/1960 | Muncheryan | 374/208 |
| 3,746,836 | 7/1973 | Summerfield et al. | 392/498 |
| 3,751,305 | 8/1973 | Huebscher | 374/208 |
| 4,124,793 | 11/1978 | Colman | 219/523 |
| 5,201,840 | 4/1993 | Sausner et al. | 374/208 |

FOREIGN PATENT DOCUMENTS

| | | | |
|---|---|---|---|
| 2554237 | 6/1977 | Germany | 219/523 |
| 2931960 | 2/1981 | Germany | 392/498 |
| 3727313 | 3/1989 | Germany | 374/208 |
| 000169 | 8/1993 | Italy . | |
| 58-117427 | 7/1983 | Japan | 374/208 |
| 2-144875 | 6/1990 | Japan | 219/505 |
| 2163328 | 2/1986 | United Kingdom | 392/498 |

*Primary Examiner*—John A. Jeffery
*Attorney, Agent, or Firm*—Guido Modiano; Albert Josif

[57] ABSTRACT

An electronic immersion heater includes a tube closed at one end that contains in succession from its bottom to its open end: a heating element, an electronic circuit board with the corresponding support and with a temperature sensor, and a hermetic plug. The electronic heater is characterized in that the sensor is pushed into direct or indirect contact with the tube by means of a single helical spring, which furthermore simultaneously acts as a spacer and as an electrical contact, without conventional rheophores, between the temperature sensor and the electronic circuit board.

12 Claims, 2 Drawing Sheets

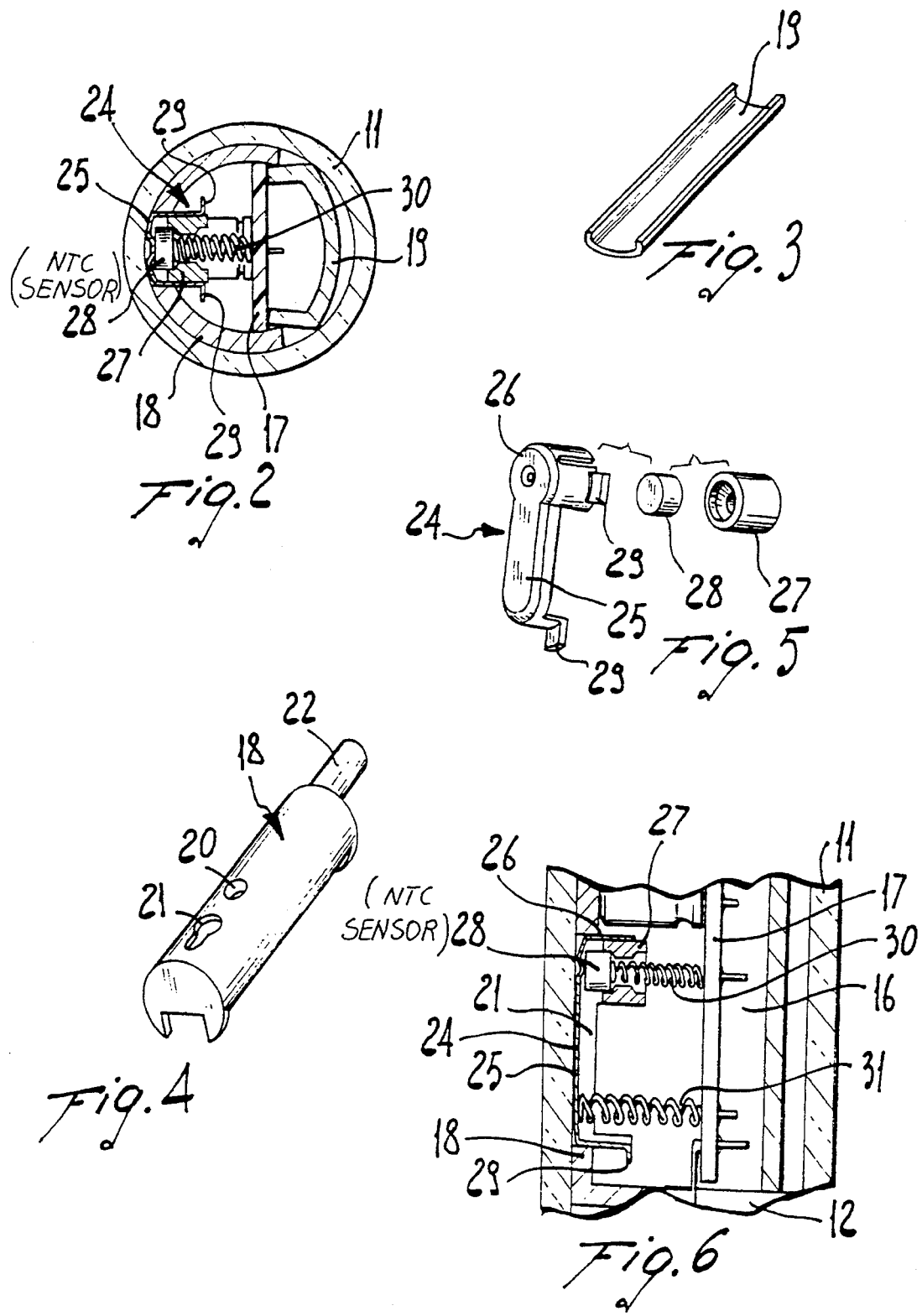

5,568,587

ELECTRONIC IMMERSION AQUARIUM HEATER WITH SPRING BIASED NTC SENSOR

BACKGROUND OF THE INVENTION

The present invention relates to an improved electronic immersion heater used particularly but not exclusively in aquariums or the like.

It is known that many of the fish species mostly cherished by aquarium owners need a very precise water temperature, since they come from tropical seas or in any case from regions with a very particular climate.

If water temperature is not kept at the ideal value within narrow limits, many of these fish species may become ill and often die.

A wide range of immersion heaters for aquariums is currently available; all, however, have a substantially identical basic structure.

Said basic structure comprises a tube, closed at one end, containing, in succession from the bottom towards the open end, a heating element, an electronic circuit board with the corresponding support and with a temperature sensor, and a hermetic plug.

The heating element is constituted by an electric resistor intermittently powered under the feedback control of the temperature sensor.

The aim of the temperature sensor is therefore to detect variations in water temperature in the aquarium and, if these temperature variations exceed certain preset limits, to drive the switch, closing or opening it and accordingly supplying power or not to the heating element.

The fundamental drawback of commercially available heaters resides in that the heating element produces such an amount of heat that, despite the dispersion provided by water and the thermal insulations provided inside the tube, the temperature sensor is affected by said heat.

In this manner, the temperature sensor does not measure the temperature conditions of the water but a combination thereof with the internal temperatures produced by the heater.

In order to obviate to this drawback it is possible to transfer the temperature sensor from the inside of the tube to the outside, connecting it to the electronic circuit board with a cable.

However, this solution has considerable practical drawbacks, the main ones being: the fragility of the component, which is no longer protected inside the tube, and the negative aesthetic impact caused by the presence of a dangling cable inside the aquarium.

Further attempts, keeping the temperature sensor inside the tube, have been made, trying in various ways to increase the interfacing between the sensor and the aquarium environment by means of the tube surface.

In this regard, the improved immersion heater for liquids disclosed in Italian patent application no. PD 93 A 000169 in the name of the same Applicant should be mentioned: the intermediary for contact between the sensor and the tube is an elastic lamina that is forced to copy the internal surface of said tube.

Although this solution improves the current technical situation, it is not free from drawbacks.

In particular, practical experience has demonstrated on one hand that not only the resistor, but also electronic components producing large amounts of heat influence the heat sensor, and on the other hand that the use of the lamina is not as effective as expected in theory, since in practice said lamina makes contact with the internal surface of the tube over very small areas.

SUMMARY OF THE INVENTION

The principal aim of the present invention is to provide an immersion heater for liquids that eliminates the drawbacks mentioned above in known types.

Within the scope of this aim, an object of the invention is to provide an immersion heater for liquids that is not difficult to assemble and can be obtained with known production means.

Another object of the invention is to provide an immersion heater for liquids, the cost whereof is competitive with respect to currently commercially available heaters.

Another object of the present invention is to provide a heater allowing fine and precise temperature adjustment in order to create an optimum environment inside the aquarium.

This aim, these objects, and others which will become apparent hereinafter are achieved by an improved electronic immersion heater, according to the invention, comprising a tube closed at one end that contains, in succession from its bottom to its open end, a heating element, an electronic circuit board with the corresponding support and with a temperature sensor, and a hermetic plug, characterized in that said sensor is pushed into direct or indirect contact with said tube by means of at least one elastic element that simultaneously acts as a spacer and as an electrical contact between said sensor and said electronic board.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein:

FIG. 2 is a sectional view of the heater, taken along the plane II—II of FIG. 1;

FIG. 3 is a perspective view of a support for the electronic board;

FIG. 4 is a perspective view of a spacer for the electronic board;

FIG. 5 is an exploded view, showing the placement of the sensor;

FIG. 6 is a partial longitudinal sectional view of the heater.

DESCRIPTION OF THE PREFERRED EMBODIMENTS

Figure 1:
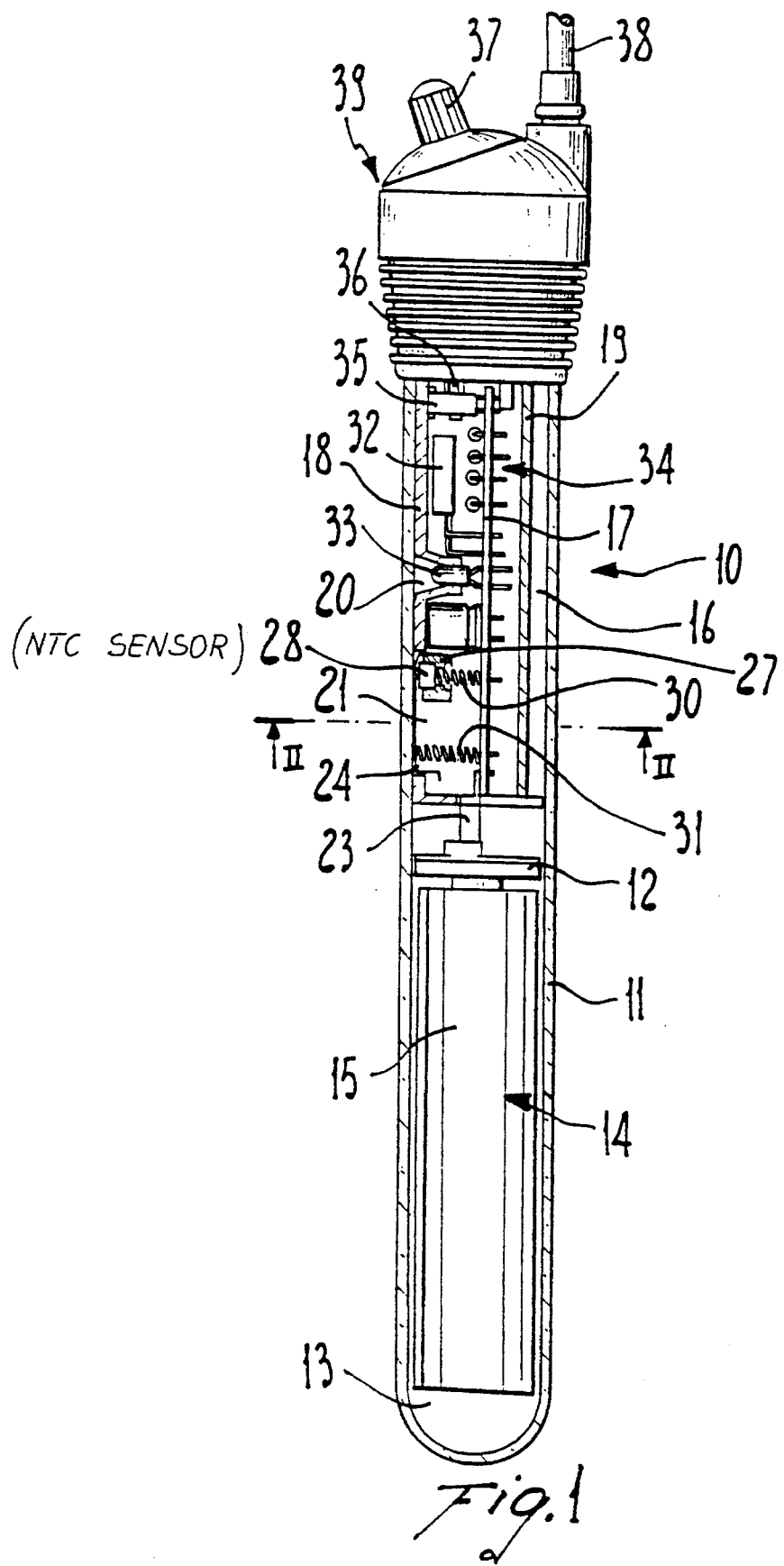
FIG. 1 is a longitudinal sectional view of the heater.

With reference to the above Figures, an electronic immersion heater for liquids, according to the invention, is generally designated by the reference numeral 10.

The electronic heater 10 comprises a tube 11 closed at one end, the internal volume whereof is divided by a circular partition 12 into two separate regions.

A heating element 14 is contained in a first region 13 that also includes the bottom of the tube 11.

The heating element 14 is constituted by a support 15 whereon an electric resistor (not shown in the figures) is wound.

An electronic circuit board 17 is contained in another or second region 16 of the tube 11.

The electronic circuit board 17 is kept in an almost diametrical position by a support 18 and by a spacer 19.

In particular, the support 18 has a substantially semicylindrical shape and such dimensions that, when it is inserted into the tube 11, its outer surface perfectly matches substantially the contour of the internal surface of said tube 11.

Furthermore, two holes 20 and 21 are also formed on the lateral surface of the support 18, the hole 20 being substantially circular, whereas the slotted hole 21 is shaped so as to form a circular enlargement at one of its ends.

A tubular element 22 also extends from a surface of the support 18 that faces the open end of the tube 11 after assembly.

As regards the spacer 19, it is substantially shaped like a curved tile, wherein the concavity is directed towards the concavity of the support 18 after assembly, said spacer 19 also acts as a cover for the electronic circuit board 17.

It should be noted that a conductor 23 electrically connects the electronic circuit board 17 to the electric resistor (which, as mentioned, is not shown in the figures) by passing through the partition 12.

A concave housing 24 is inserted in the complementarily shaped hole 21, and the cavity of said housing is directed towards the electronic circuit board 17 after assembly.

The housing 24 makes contact with the internal surface of the tube 11 by means of one of its front surfaces 25, shaped so as to partially copy said internal surface.

In a region 26 shaped so as to form a partial cylinder, the housing 24 furthermore contains, by cooperating with a guiding and containment ring 27, a sensor 28 of the NTC pellet type without rheophores.

The guiding ring 27, the sensor 28, and the region 26 are mutually coaxial; the ring 27 furthermore couples, as a shaft, to the region 26 by interference fit.

Also as regards the housing 24, guiding tabs 29 are provided that extend from its edge and are mutually arranged so as to substantially form a cross.

The sensor 28 is pushed against the internal surface of the housing 24 by means of a first helical spring 30 that is coaxial to said sensor.

The spring 30 is made of conducting material, and thus not only spaces the sensor 28 and the electronic board 17, but also provides their mutual electrical connection.

A second helical spring 31 is interposed between the housing 24 and the electronic board 17.

Said spring 31, the axis whereof is substantially parallel to the spring 30, provides a further spacing element, since it, too, pushes the housing 24 against the internal surface of the tube 11.

From the electrical point of view, the spring 30, the housing 24, and the spring 31 are mutually series-connected, so as to form a circuit that closes with the circuitry provided on the electronic circuit board 17 and is not illustrated in the figures.

An electronic component 32, such as a TRIAC or SNC, placed proximate to the open end of the tube 11, a LED 33 facing the tube by means of the hole 20, and supply and dropping resistors 34 for the LED are connected to the board 17.

Mention should also be made of a potentiometer 35, pivoted to an adjustment knob 37 about a pivot 36, and of an electric power supply cable 38.

Finally, the knob 37 is arranged on the top of a hermetic plug 39, the power supply cable 38 also passing therethrough.

The configuration having been outlined, at this point it should be stressed that the arrangement of the sensor 28 is determined by taking into account substantially two different heat distributions.

Said two heat distributions refer to the heater 10 when it is immersed in water and when it is exposed to the air respectively.

In order to achieve optimum operation, when the heater 10 is immersed, the sensor 28 is placed in a minimum-temperature region, whereas when the heater is exposed to the air said region is highly affected by the electric resistor.

In this manner, when the heater 10 is immersed in the aquarium, the sensor 28 correctly detects the water temperature, thus allowing precise and reliable adjustment, whereas when said heater is removed from the aquarium for maintenance or other reasons, the electric resistor becomes the main source of influence for the sensor 28, causing its immediate disconnection and thus preventing the tube 11 from cracking.

In practice it has been observed that the intended aim and objects have been achieved; in particular, it should be noted that although the basic structure of the heater has been kept substantially unchanged, considerable insulation of the sensor when immersed has been achieved.

It should also be noted that this insulation has been achieved with extremely simple and inexpensive means.

It should also be noted that the elastic elements ensure excellent repeatability and reliability in aquarium temperature control.

The invention thus conceived is susceptible of numerous modifications and variations, all of which are within the scope of the inventive concept.

All the details may furthermore be replaced with other technically equivalent elements.

In practice, the materials, so long as they are compatible with the contingent use, as well as the dimensions, may be any according to the requirements.

What is claimed is:

1. An electronic immersion heater comprising:

a hollow tube with an internal surface;

a heating element located inside said tube;

an electronic circuit board mounted inside said tube and electrically connected to said heating element;

a temperature sensor electrically connected to said electronic circuit board;

a single helical spring made of electrically conducting material and directly interconnected between said temperature sensor and said electronic circuit board for pushing said sensor towards said internal surface of the tube and away from said electronic circuit board, said temperature sensor being directly electrically connected with said electronic circuit board by means of said single helical spring without means of rheophores.

2. Electronic immersion heater according to claim 1, wherein said single helical spring is connected to said electronic circuit board in a region of minimum temperature during immersion.

3. Electronic immersion heater according to claim 1 further comprising a housing interposed between said sensor and said internal surface of said tube, said housing being shaped so as to substantially match the contours of a corresponding portion of said internal surface of said tube against which said housing engages.

4. Electronic immersion heater according to claim 1, wherein said sensor is of the NTC pellet type with a disk-like shape having one face connected with said single helical spring and an opposite face directed towards said internal surface of said tube.

5. Electronic immersion heater according to claim 1, further comprising a housing interposed between said sensor and said internal surface of said tube, said housing being shaped so as to substantially match the contours of a corresponding portion of said internal surface of said tube against which said housing engages, and wherein said sensor is of the NTC pellet type with a disk-like shape having one face connected with said single helical spring and an opposite face engaged in direct spring-biased contact by means of said single helical spring with said housing.

6. Electronic immersion heater according to claim 5, wherein said opposite face of said NTC sensor is pushed into contact with said housing by said single helical spring through a guiding and containment ring, said ring being coupled by interference fit to a corresponding complementarily shaped region of said housing.

7. Electronic immersion heater according to claim 3, further comprising a second helical spring having a longitudinal axis extending substantially parallel to a longitudinal axis of said single helical spring, said second spring being interconnected between said housing and said electronic circuit board for pushing said housing against said internal surface of said tube.

8. Electronic immersion heater according to claim 7, wherein said second helical spring is electrically connected to said electronic circuit board, and wherein said single helical spring, said housing, and said second helical spring are mutually electrically connected in series.

9. Electronic immersion heater according to claim 3 further comprising a semi-cylindrical support positioned inside said tube in engagement with said internal surface of said tube and being provided with a slotted hole in which said housing is positioned in contact with said internal surface of said tube.

10. Electronic immersion heater according to claim 1 further comprising electronic devices producing heat which are located on said electronic circuit board distally from said heat sensor.

11. Electronic immersion heater according to claim 10, wherein said electronic devices comprise a TRIAC, and power supply and dropping resistors for a LED.

12. Electronic immersion heater according to claim 11, wherein said TRIAC has rheophores shaped so as to space said TRIAC from said electronic circuit board insofar as said internal surface of said tube allows.

* * * * *